US010902364B2

(12) United States Patent
Baskar et al.

(10) Patent No.: US 10,902,364 B2
(45) Date of Patent: Jan. 26, 2021

(54) AUTOMATIC ZOOM CONTROL SYSTEM FOR WORKFORCE TIMELINE

(71) Applicant: ORACLE INTERNATIONAL CORPORATION, Redwood Shores, CA (US)

(72) Inventors: Malinidevi Baskar, Chennai (IN); Alwyn Simson D'souza, Bangalore (IN); Mudit Gupta, Bangalore (IN)

(73) Assignee: Oracle International Corporation, Redwood Shores (CA)

( * ) Notice: Subject to any disclaimer, the term of this patent is extended or adjusted under 35 U.S.C. 154(b) by 729 days.

(21) Appl. No.: 15/341,466

(22) Filed: Nov. 2, 2016

(65) Prior Publication Data

US 2018/0107960 A1 Apr. 19, 2018

Related U.S. Application Data

(60) Provisional application No. 62/409,938, filed on Oct. 19, 2016.

(51) Int. Cl.
*G06Q 10/06* (2012.01)
(52) U.S. Cl.
CPC .............................. *G06Q 10/06314* (2013.01)
(58) Field of Classification Search
CPC ............................................... G06Q 10/06314
See application file for complete search history.

(56) References Cited

U.S. PATENT DOCUMENTS

| 6,144,971 A | 11/2000 | Sunderman et al. |
| 7,394,563 B2 * | 7/2008 | Fujisawa ................. G06T 11/60 358/1.16 |

(Continued)

FOREIGN PATENT DOCUMENTS

WO 2015029073 A2 3/2015

OTHER PUBLICATIONS

Parker, Visualization of Large Nested Graphs in 3D: Navigation and Interaction, Journal of visual Langauges and Computing, 1997, 301, 307 (Year: 1997).*

(Continued)

*Primary Examiner* — Renae Feacher
*Assistant Examiner* — V K Puri
(74) *Attorney, Agent, or Firm* — Kraguljac Law Group, LLC

(57) ABSTRACT

Systems, methods, and other embodiments associated with automatically controlling a zoom level are described. In one embodiment, a method includes accessing a database and retrieving a plurality of data records based on at least one match parameter, wherein each data record is assigned to an employee and includes a scheduled time range in a work day for the employee. The data records are parsed and a minimum time and a maximum time from the scheduled time ranges are determined. The method controls a zoom level for a display for displaying the scheduled time ranges from the plurality of data records by determining a screen area in a user interface for displaying the scheduled time ranges, and generating a graphical timeline to fit between the minimum time and the maximum time and adjust a size of the graphical timeline based at least in part on the determined screen area.

17 Claims, 6 Drawing Sheets

(56) References Cited

U.S. PATENT DOCUMENTS

| | | | |
|---|---|---|---|
| 8,306,854 B1* | 11/2012 | Bray | G06Q 10/0633 |
| | | | 705/32 |
| 8,670,552 B2 | 3/2014 | Keren et al. | |
| 8,670,553 B1 | 3/2014 | Marr et al. | |
| 8,719,067 B2 | 5/2014 | Fama et al. | |
| 9,423,943 B2 | 8/2016 | De et al. | |
| 9,754,394 B2* | 9/2017 | Matsuo | G06F 3/04842 |
| 2003/0167193 A1 | 9/2003 | Jones et al. | |
| 2004/0008356 A1* | 1/2004 | Fujisawa | G06T 11/60 |
| | | | 358/1.2 |
| 2007/0094109 A1* | 4/2007 | Perry | G06Q 10/06 |
| | | | 705/32 |
| 2007/0179829 A1 | 8/2007 | Laperi et al. | |
| 2010/0324964 A1 | 12/2010 | Callanan et al. | |
| 2012/0215578 A1 | 8/2012 | Swierz, III et al. | |
| 2015/0082198 A1* | 3/2015 | Destagnol | G06F 3/0484 |
| | | | 715/753 |
| 2015/0253967 A1 | 9/2015 | De et al. | |
| 2016/0042540 A1* | 2/2016 | Drucker | G06T 13/80 |
| | | | 345/440 |
| 2016/0162478 A1* | 6/2016 | Blassin | G06Q 10/06311 |
| | | | 706/12 |
| 2016/0180555 A1* | 6/2016 | Matsuo | G06T 11/206 |
| | | | 345/440 |
| 2018/0114166 A1* | 4/2018 | Takasaki | G06F 16/00 |

OTHER PUBLICATIONS

Aspect Software, INC., Aspect EQ—Workforce Management—Apr. 2016, pp. 1-5, downloaded from: http://www.aspect.com/globalassets/aspect-eq-workforce-management-ds.pdf.

VPI Corp., Best Workforce Management Software for Call Centers, pp. 1-4, downloaded from: http://www.vpi-corp.com/call-center-workforce-management-software.asp—on Oct. 31, 2016.

In Contact, Workforce Management in the Contact Center—2010, pp. 1-19, downloaded from: http://www.incontact.com/sites/default/files/resources/workforce-management-call-center.pdf.

Kronos, Inc., Kronos Workforce Central Suite, pp. 1, downloaded on Oct. 31, 2016 from: http://www.kronos.com/products/workforce-management-suite.aspx.

Reactore, Human Resource Management, pp. 1-5, downloaded Jun. 8, 2016 from: http://reactore.com/hr/#.

HCM Product Marketing and Strategy, Oracle Corporation, Oracle White Paper—Delivering Value With PeopleSoft Enterprise 9.1 Human Capital Management, pp. 1-21, Jan. 2010.

* cited by examiner

AUTOMATIC ZOOM CONTROL SYSTEM FOR WORKFORCE TIMELINE

CROSS REFERENCE TO RELATED APPLICATIONS

This disclosure claims the benefit of U.S. Provisional Patent Application serial number "62/409,938" filed Oct. 19, 2016, titled "Automatic Zoom Control System for Workforce Timeline", which is incorporated by reference herein in its entirety.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Computerized systems have been created for organizations to report, plan, schedule, and manage time for employees of the organization. One function provided by the computerized systems is to assist managers to view and understand data related to the employees that report to the manager. For example, a manager can use data about work schedules for employees to monitor and manage the availability of the employees for working certain days and times. The manager can track the availability of team members at any given time of the day and can monitor the schedule adherence and then plan a schedule coverage.

For large organizations, the amount of data becomes overwhelming. To manage the data, prior systems relied on the user/manager to select specific parameters such as specific dates and specific times of a day in order to view employee data for the selected time period. However, the manager was required to guess at which time period was relevant to the team members. This introduced errors that caused employee data to be omitted because a manager cannot keep track of a large team of employees. For example, if a time period was selected to display data for all employees in a work schedule between 7:00 AM and 6:00 PM but there were employees that worked outside the selected time period, then some data was omitted.

Furthermore, the system had to generate a screen view of the employee data that was displayed in a twenty four hour range for a selected day. However, a display screen area is limited in size. Prior systems did not consider the best use of screen area or real estate of the display area. Thus, data was displayed across a default 24 hour timeline regardless of whether there was too much data or not enough data for the display. When too much data was displayed relative to the screen size, horizontal scroll bars were displayed to allow a user to horizontally scroll across the display screen to see data that did not fit in a viewable area of the display. Using horizontal scroll bars to see large amounts of data is considered a bad user experience. Conversely, generating too much white space (unused areas with no data) on the display area is considered poor use of an important computer resource; the screen real estate.

In prior systems, if a user manually zoomed out to have an entire timeline viewed in a display area, individual elements of the timeline became typically too small in size to be legible, rendering the view cluttered and effectively useless. If, on the other hand, the user manually zoomed into a specific portion of the timeline, all other portions of the timeline were no longer displayed within the display area. Thus, an overall context of the timeline was lost, and the user was required to navigate back and forth within the timeline in order to do any meaningful examination and take any remedial action.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are disclosed that implement techniques for automatically controlling a zoom level of a display. In one embodiment, the computerized system generates a visual graphic representation of a timeline and associated workforce data and automatically adjusts the zoom level of the timeline. The zoom level is determined based, at least in part, on an available screen area and a time range that is determined from a population set of the workforce data. In this manner, limited space in display areas are used in a more optimized way to display relevant data based on a size of the display area.

Figure 1:
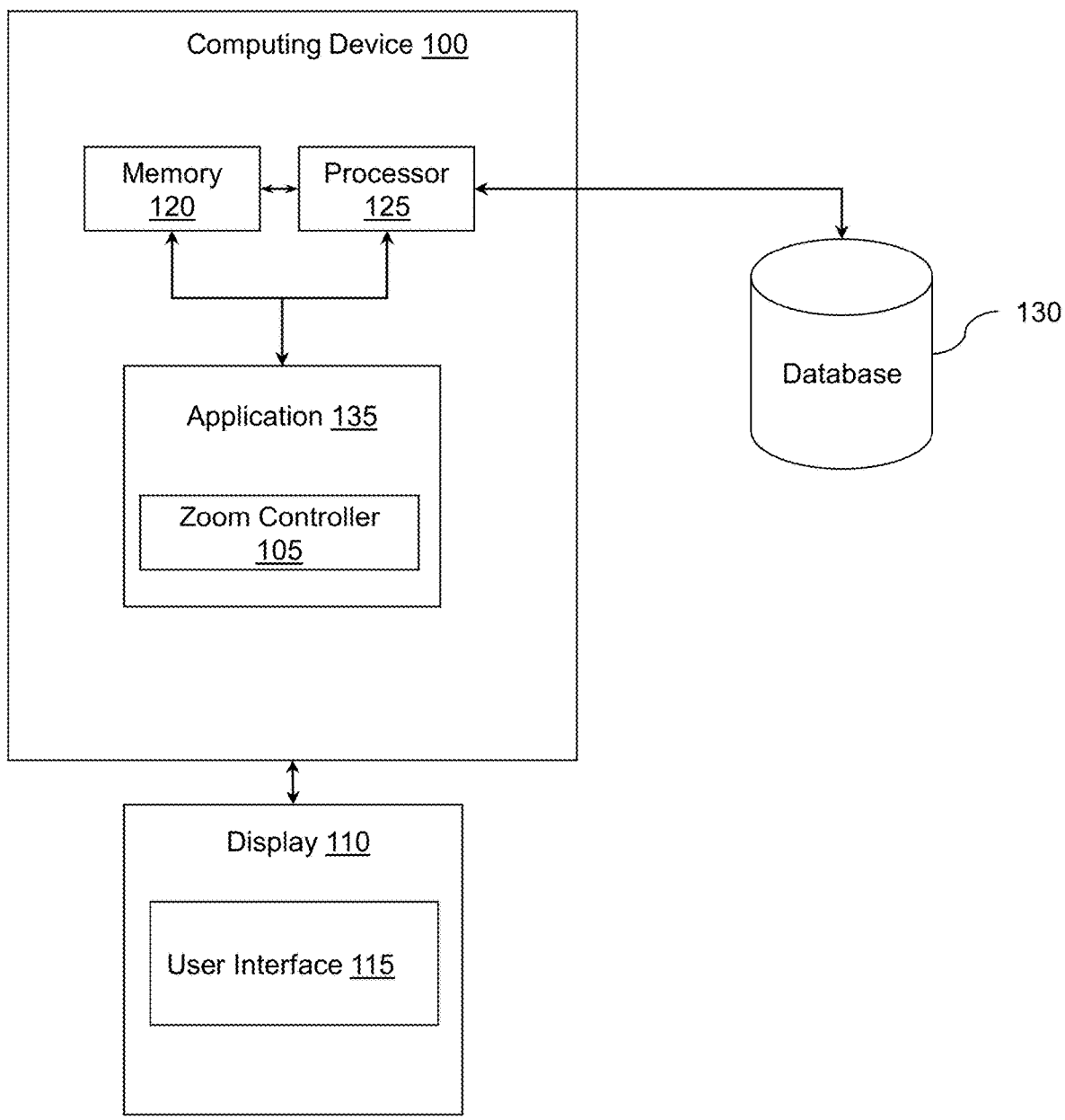
FIG. 1 illustrates one embodiment of a computer system configured with a zoom controller associated with the present system.

With reference to FIG. 1, a computing device 100 is illustrated that is configured with a zoom controller 105 to automatically control a zoom level on a display 110 and adjust the zoom level of a timeline displayed in a user interface 115. In one embodiment, the computing device 100 includes at least one memory 120 that is connected to the processor 125 by a communication path (e.g., a bus) or the memory 120 may be integrated with the processor 125. The processor 125 uses the memory 120 to store instructions and/or data for processing. The computing device 100 includes input/output ports for communicating with one or more external storage devices (non-transitory computer-readable medium) that contains a database 130 of workforce data including employee time data as will be discussed below. A more detailed example of the computing device 100 is provided in other figures.

In one embodiment, the zoom controller 105 is part of a larger executable application 135 that processes the workforce data and generates displays as part of the user interface 115 on the display 110. In one embodiment, the application 135 is a workforce availability application configured to analyze and compile work data from employee data records including scheduled work hours, reported work hours, absence time, and time in training. The analyzed and compiled data provides information for monitoring employee availability and schedule adherence.

Figure 2:
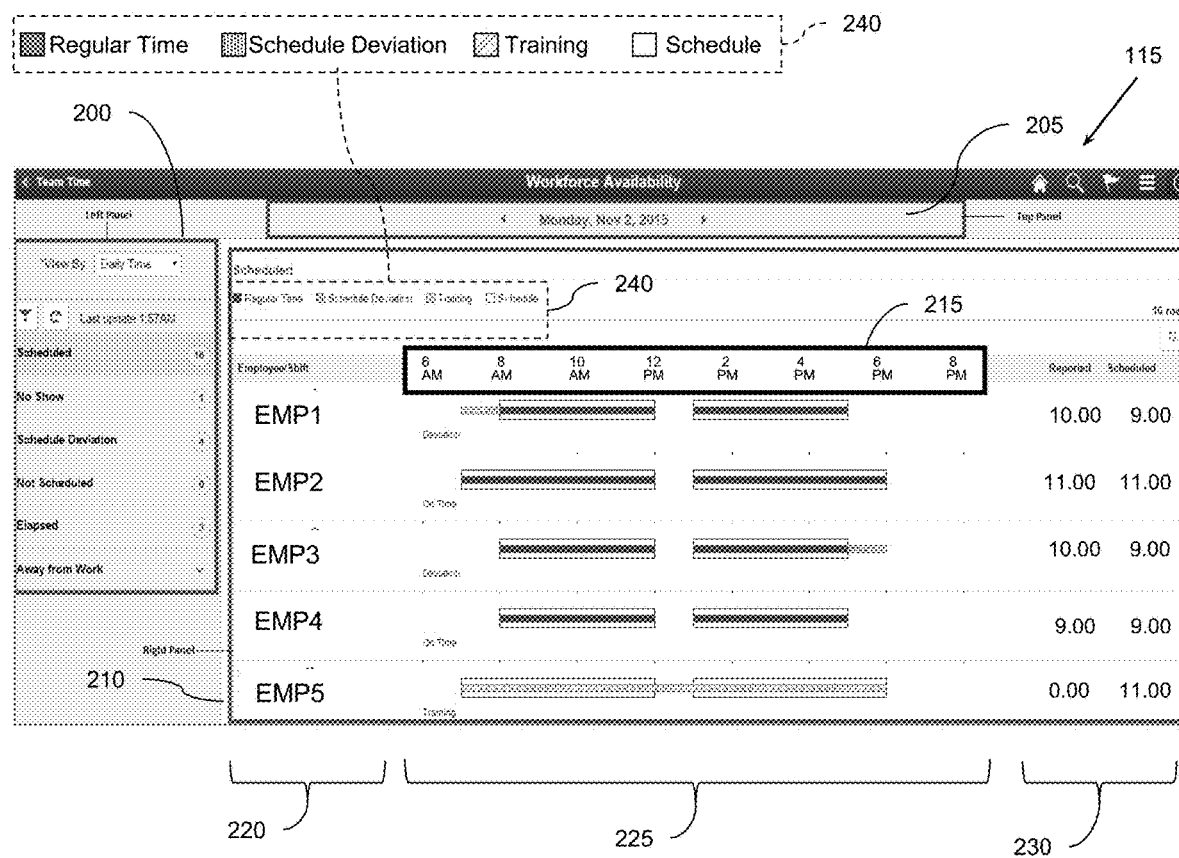
FIG. 2 illustrates one embodiment of a display screen of a user interface associated with the present system.

With reference to FIG. 2, in one embodiment of a graphical display is illustrated that is generated as part of the user interface 115 and displayed on the display 110. The user interface 115 is configured with multiple panel displays/windows for presenting content and/or menu functions for manipulating the content displayed. The panel displays may include a left panel 200, a top panel 205, and a right or center content panel 210. Of course, any number of panels may be generated, organized relative to each other, and displayed on the display.

In one embodiment, the left panel 200 is configured for displaying options for filtering data based on one or more categories. Example categories include but are not limited to Scheduled, No Show, Scheduled Deviation, Not Scheduled, Elapsed, Away from Work. "Scheduled" category shows the employees that were scheduled to work in a selected time period. "No Show" category indicates details of employees, who are scheduled to work but have not reported any time, are not in absence or are not in training. "Schedule Deviation" category shows the employees who deviated from their schedule. This would apply to, for example, employees who report time using punch time. "No Scheduled" category shows elapsed and punch time employees with scheduled off/holiday for that particular day. "Elapsed" category shows a list of elapsed time reporters who have reported time. "Away from Work" category shows sub-categories of reasons from being away from work such as approved absence, unapproved absence, in training, and comp time off.

In the user interface 115, each of these categories is configured as a selectable function that when selected causes the system to filter the retrieved data records and show the employee data records that match the selected category. In FIG. 2, the "Scheduled" category in the right panel 200 is highlighted as being the selected category. The employee records that match the Scheduled category are displayed in the content panel 210.

Based on a number of records retrieved and displayed in the content panel 210, the system summaries a count total of how many records match each functional category and displays the count total next to the associated category. In the illustration in FIG. 2, the category "Scheduled" includes "16" records (e.g., 16 employees matched the scheduled category meaning they were scheduled to work during the time period selected for display. The left panel 200 provides selectable controls which lets a user launch a 'Daily View' or a 'Weekly View' of employee records. Details for each of the categories selected in the left panel are displayed in the right panel 210.

In one embodiment, the top panel 205 is configured for displaying a selected date relevant to the data displayed in a right or main content panel 210. In response to a specific date selected via the interface, the top panel 205 indicates the date for displaying a 'Daily View' for the data records that are retrieved for display in the content panel 210.

In the Daily View display function, a user (e.g., a manager of a group of employees) can select this view to cause the system to retrieve schedule data, reported time, absence and training information for all or a selected set of employees on a day-to-day basis. The 3-panel layout of the user interface 115 allows the user select a date from the top panel 205 and the corresponding content from the retrieved records is refreshed and displayed in the right panel 210 to show the details which correspond to the date chosen.

In the Weekly View display function, the user can select this view to cause the system to retrieve schedule data, reported time, absence and training information for all or a selected set of the employees in the group on a weekly basis. The 3-panel layout allows the user select a date from the top panel 205 and the content corresponding content from the retrieved records is refreshed and displayed in the right panel 210 to show the details which correspond to the date chosen. The Daily View and Weekly View functions are provided as selectable functions in a "View By" dropdown option, which is displayed at the top portion of the left panel 200 in FIG. 2.

The user interface 115 is configured to visually represent various types of data from the database 130 that are retrieved based on one or more selected criteria for matching and retrieving data records. In the example for discussion, the data records relate to workforce data that describe work details for employees of an organization. A data record for each employee may include at least employee name, home address, employee identification, job title, and other identification data. Each employee record also includes work schedule data such as, for designated days and time periods, information for scheduled work hours and for completed work days, actual reported work hours.

For example, for a selected group of employees, corresponding workforce data records are retrieved and schedules, reported time, time in training, and schedule deviation data for the employees is compiled and displayed in relation to a generated timeline 215. As previously stated, the compiled data (as seen in the content panel 210) provides information for monitoring employee availability and schedule adherence.

In one embodiment, the right content panel 210 is generated to display employee data in at least three columns including an employee column 220 that identifies employees (e.g., EMP1, EMP2, EMP3 . . . EMPn) in the set of retrieved records; a column 225 of corresponding work schedule data for the employee; and a column 230 for actual reported hours and scheduled hours for the employee in a number format. Data representing a schedule of hours for the selected day is displayed in horizontal bars that extend under the timeline 215. The horizontal bars are displayed with one or more visually distinguishing graphics to convey different types of work hours for each employee. A legend 240 (which is also shown in an expanded view) identifies the different types of work hours and the associated graphic. For example, "Regular Time" is solid color (e.g., green), "Schedule Deviation" is a dotted pattern, "Training" is a hatching pattern, and "Schedule" is an outlined white box.

In one embodiment, the graphics for different types of work hours are superimposed over each other in the horizontal bars to show what type of work hours were performed by an employee. For example, employee 2 (EMP2) shows scheduled hours (outlined block) from 7 AM to 12 PM and from 1 PM to 6 PM. The outlined block also includes a solid color (green) block inside that represents "Regular Time." In column 230, EMP2 has 11.00 reported hours and 11.00 scheduled hours. The horizontal bar for EMP5 shows the employee was in "Training" from 7 AM to 6 PM (e.g., hatching pattern within Schedule bar). In one embodiment, a break in a horizontal bar such as in the time period of 12 PM to 1 PM may designate a meal break.

Figure 3:
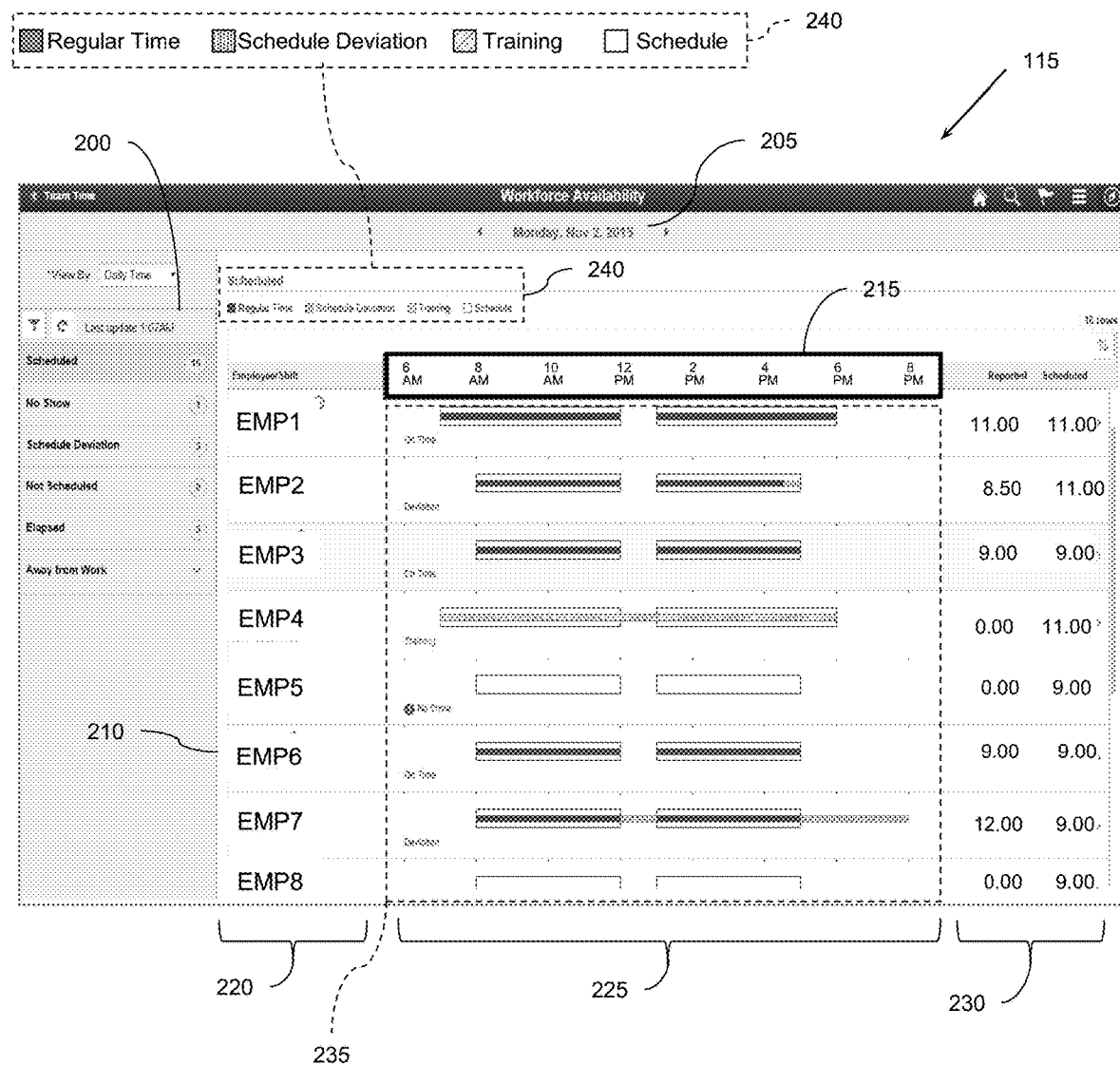
FIG. 3 illustrates one embodiment of display screen associated with controlling a zoom level of a display of a timeline.

With reference to FIG. 3, one embodiment of a display of the user interface 115 is shown with an automatic zoom control for the timeline 215. Zoom controller 105 (seen in FIG. 1) is configured to analyze data records and identify a window size and zoom level for the timeline 215. The zoomed timeline 215 is generated to represent the employee data in column 225 that a user/manager might be interested in so that the data fits in the display area without having to use horizontal scroll bars to scroll the displayed data to the left or right.

In one embodiment, the zoom controller 105 determines a size and view of the timeline 215 for a given day based on minimum and maximum values of time for an identified set of employee data records. The zoom controller 105 determines and calculates a display area for the timeline 215, which is between column 220 and column 230. The display area is based on a physical size of the display 110 (form factor), a size of the window of the user interface 115, and a width across the column 225. For example, the width of column 225 may be found by determining a number of pixels across the width of the display area represented by a dashed outline 235 of column 225. Values for these parameters may be used to determine a length of the timeline 215 that extends between columns 220 and 230. The window size of the user interface 115 can vary and be changed by a user as can a typical graphical window. In one embodiment, the window size of the user interface 115 at a particular time can be found by retrieving window size settings and/or parameters from a function available from an operating system of the computer device 100.

Furthermore, the zoom controller 105 analyzes the retrieved employee data records and determines minimum and maximum time values from the retrieved data set. A minimum time value may come from one employee record in the data set and the maximum time value may come from a different employee record. The values are determined individually from the data records and are not dependent on being in the same record. However, both values may come from the same employee record in certain data sets. The timeline 215 is then generated to fit in the determined width of the display area (e.g., column width of 235) and zoomed between the minimum and maximum time values. Thus, rather than displaying a default 24 hour timeline for every set of data records, the zoom controller 105 automatically adjusts or readjusts the displayed size of the timeline 215 based on the minimum and maximum values identified from the set of data records (which can change for each search of employee records).

In FIG. 3, the timeline 215 is generated to fit between 6 AM and 8 PM. This is determined by the zoom controller 105 by analyzing the retrieved employee records and identifying a minimum time value from the records (e.g., a minimum time for scheduled hours or reported hours from the data records). In FIG. 3, the minimum time value identified from the data records is 6 AM. The minimum value is determined from an employee data record (not shown) from the set of retrieved records that has a start time of 6 AM. The minimum value is found by comparing start times from all the retrieved records and identifying the minimum start time. A similar analysis is performed for identifying a maximum time value from the records, which in FIG. 3 is 8 PM. Here, after comparing ending times from the data records, the maximum time value is determined from the employee data record of EMP7 whose work hours extend to 8 PM. The zoom controller 105 determines the zoom level using this process and the resulting minimum and maximum values in combination with the determined column width of outline 235. The minimum and maximum time values are set as end points for the zoom level and thus the end points for the timeline 215. The timeline 215 is then zoomed (expanded or contracted) to fit within the minimum and maximum hours identified from the retrieved set of records. The corresponding employee schedule data is then displayed under the timeline 215 in column 225. In this manner, the displayed data of employee work hours fits within the zoomed timeline 215 in an optimized size.

Figure 4:
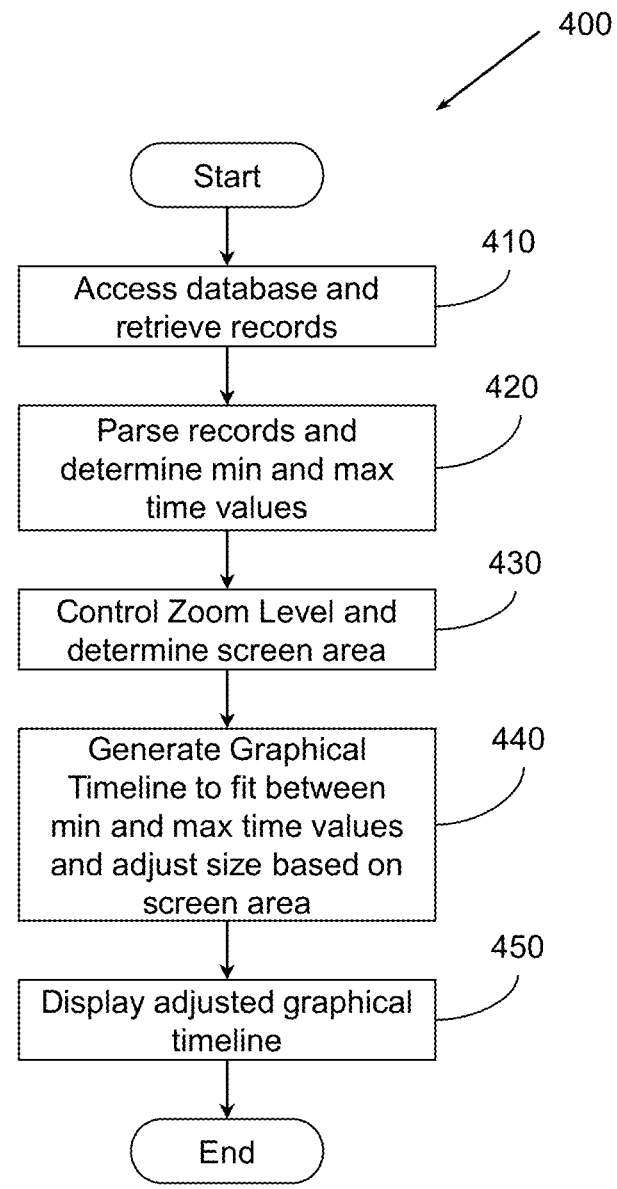
FIG. 4 illustrates one embodiment of a method associated with controlling a zoom level.

With reference to FIG. 4, one embodiment of a method 400 is shown that corresponds to the functions and algorithm performed by the computing device 100 and at least the processor 110, and the zoom controller 105 (seen in FIG. 1). Method 400 will be described with reference to FIG. 3 and the user interface 115 as displayed in FIG. 3.

Method 400 may initiate in response to a request for data relating to a group of employees of an organization. One or more match parameters may be selected and identified via the user interface 115 to control which data records to retrieve from the database 130. The match parameters may include, but are not limited to, employees that are assigned to a manager or department, employees that are scheduled to work on a selected day.

In response to the request, at 410, the computing device accesses the database 130 and retrieves a plurality of data records that match a query based on at least one match parameter. As previously explained, each data record is assigned to an employee and includes a scheduled time range in a work day for the employee. For example, each data record may include a scheduled start time and scheduled end time, and also an actual reported start time and reported end time that may differ from the scheduled start and end times.

At 420, the retrieved data records are parsed to determine a minimum time and a maximum time from the scheduled time ranges from the employee records. The minimum and maximum times represent a time range within which all work data from the employee records fall into. Thus if the minimum and maximum time values are 7 AM and 5 PM, respectively, the system determines that all the work data from the retrieved records is between this time period. The system also determines that there is no work data outside this time period in the day (e.g., between 12 AM and 7 AM, and between 5 PM and 11:59 PM). In FIG. 3, the minimum time value is 6 AM and the maximum time value is 8 PM as determined from the retrieved data records. The minimum and maximum time values are determined individually from the data records and are not dependent on the same employee data record (values can come from different records, or the same record). The minimum time value may be found in a data record from a first employee and the maximum time value may be found in a second employee.

In one embodiment, if the data records include multiple types of time values, an absolute minimum and absolute maximum time values are determined from the retrieved data records by analyzing the multiple types of time values. For example, the data records are parsed to identify time values for actual reported hours for each employee and scheduled hours. In many instances, these time values are different for an employee. If the scheduled start time for the employee is 7 AM, but the employee actually started at 6 AM (actual reported time), then the actual reported time is taken as the absolute minimum value. This additional hour will expand the range of the timeline 215 and thus change the zoom level of the timeline 215. The minimum time is determined as an absolute minimum time between both the scheduled time values and the actual hours reported. The maximum time is then determined in a similar manner as an absolute maximum time from both the scheduled time ranges and the actual hours reported.

At 430, the zoom controller 105 controls a zoom level for the display 110 for displaying the scheduled time ranges from the plurality of data records. The zoom controller 105 determines a screen area in the user interface 115 for displaying the scheduled time range in the timeline 215. For example, a width of column 225 is calculated based on the screen width in pixels of the display area represented by the dashed outline 235, which is the determined screen area in the user interface 115 for the timeline 215 generated and displayed as a graphical object.

In one embodiment, the zoom controller 105 adjusts the size of the graphical timeline 215 to expand across the determined screen area and to display all the scheduled time ranges represented by graphical bars to fit and be displayed in their entirety in the column 225 under the graphical timeline 215. Thus, a horizontal scroll bar is not displayed and not used to view the work data. Thus, the horizontal bars that represent the work hours for each employee does not extend outside the boundaries of column 225. For example, the bars are displayed within the outline 235 and the bars do not overlap into other columns 230 or extend outside of the window of the user interface 115 thereby extending into a non-visible area where the bars cannot be seen in their entirety.

At 440, a graphical timeline is generated to fit between the minimum time and the maximum time and a size of the graphical timeline is adjusted based at least in part on the determined screen area. At 450, the adjusted graphical timeline is displayed on the display 110 in the determined screen area. In the example, of FIG. 3, the timeline 215 is generated to fit in the screen area of the width of outline 235 and the range is adjusted based on the determined minimum time value (6 AM) and maximum time value (8 PM). In one embodiment, the size of the graphical timeline 215 is adjusted to expand across the determined screen area to reduce an amount of unused screen area (e.g., reduce white space of the display that has no data).

Figure 5:
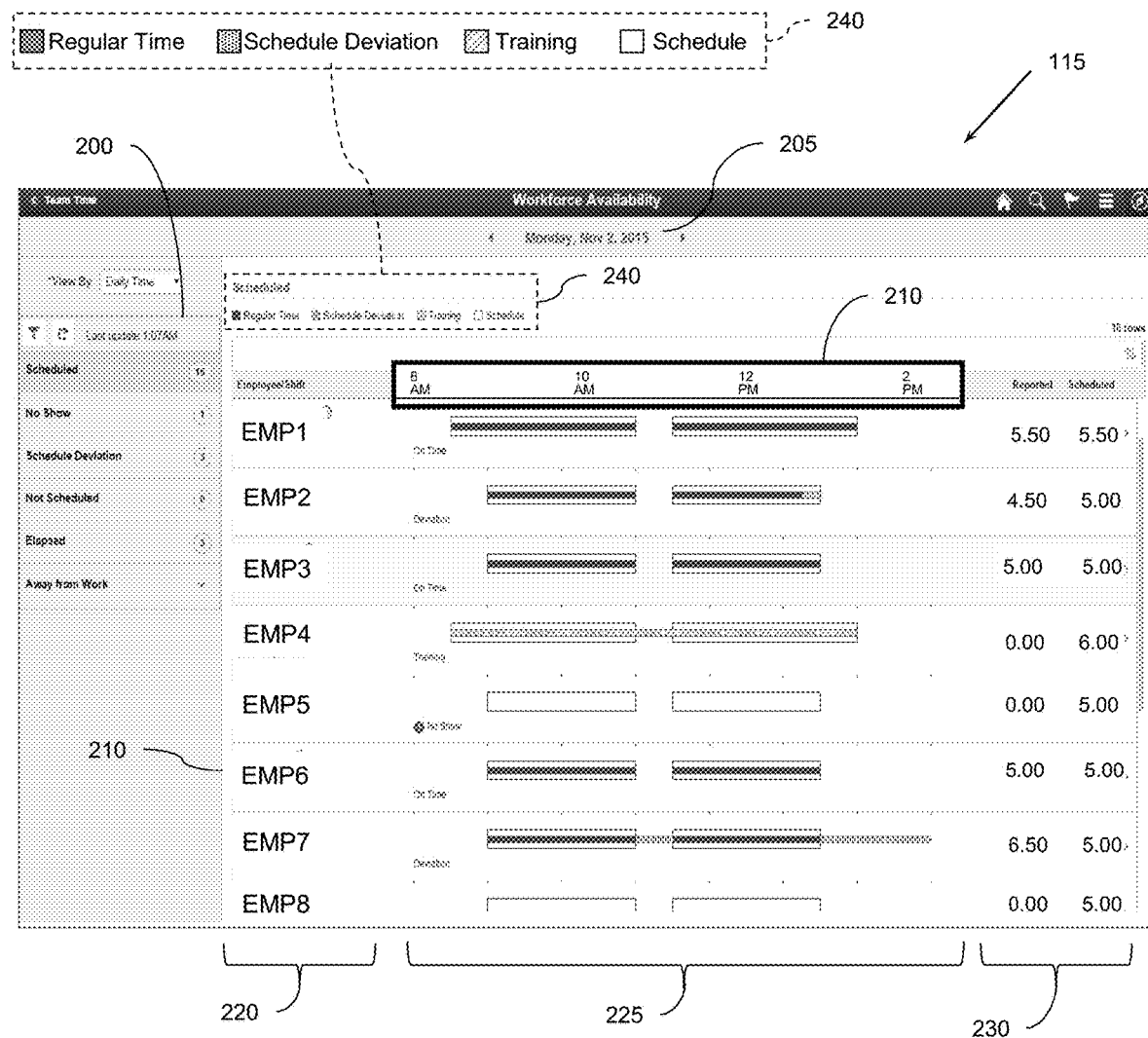
FIG. 5 illustrates another embodiment of the display screen of FIG. 3 with an adjusted zoom level for the timeline.

With reference to FIG. 5, the user interface 115 of FIG. 3 is shown with an adjusted zoom level for the timeline 215. The zoom level is based on a time range between 8 AM and 2 PM, which is determined from a set of retrieved data records. The timeline 215 is regenerated and displayed in the adjusted zoom level.

Thus, the present system determines boundaries that encapsulate all the data of a retrieved population of data records. As a result, the display area is optimized to improve the use of the display so that the employee data fits more appropriately in the area of column 225. The timeline 215 is zoomed to a range based on the determined minimum and maximum time values as determined from the retrieved set of data records. As the data records change and their associated time values change, the zoom level and range of the timeline 215 is automatically adjusted and regenerated. Useful data is not excluded from the viewable display, which occurred in prior systems that relied on a user to select a time period for the timeline 215. Thus a user does not need to manually control the timeline range and employee data is not omitted from the display since the data is fitted for the display.

Accordingly, a user/manager does not have to guess at which time period is relevant to members of his/her team of employees. Thus, errors are reduced that were previously caused by employee data being omitted or not being seen within a viewable display area in the user interface. The present system provides a zoom control and display solution that does not employ a 24 hour depiction of the timeline by default. The calculation of relevant hours for any given day is based on the minimum and maximum values determined from a population of identified employee records. As a result, the same display space is utilized to represent data more effectively and minimizes white space of the display that has no data.

Cloud or Enterprise Embodiments

In one embodiment, the computing device 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the computing system is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 6:
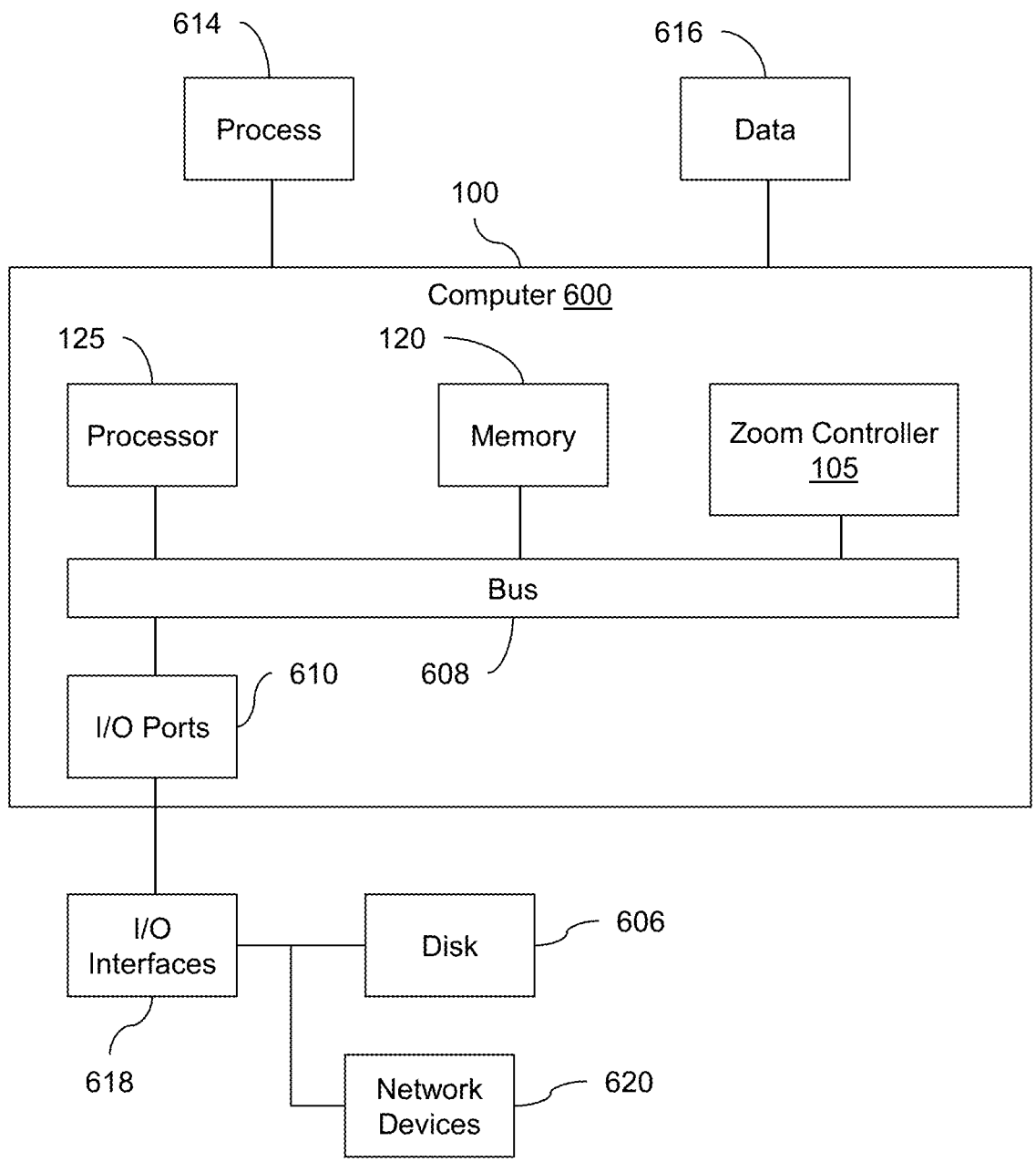
FIG. 6 illustrates an embodiment of a computing system configured with the example systems and/or methods disclosed for zoom control.

FIG. 6 illustrates one embodiment of the computing device 100 from FIG. 1 that is configured and/or programmed with one or more of the example systems and methods described herein, and/or equivalents. The example computing device may be a computer 600 that includes at least one processor 125, memory 120, and input/output ports 610 operably connected by a bus 608. In one example, the computer 600 is configured with the zoom controller 105 configured to facilitate automatic zoom control of a graphical timeline shown in FIGS. 1-5. In different examples, the zoom controller 105 may be implemented in hardware, a non-transitory computer-readable medium with stored instructions, firmware, and/or combinations thereof. While the zoom controller 105 is illustrated as a component attached to the bus 608, it is to be appreciated that in other embodiments, the zoom controller 105 could be implemented as a stored module of instructions in the processor 125, stored in memory 120, or stored in disk 606.

In one embodiment, zoom controller 105 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to control the zoom level of a graphical timeline as previously described. The means may also be implemented as stored computer executable instructions that are presented to computer 600 as data 616 that are temporarily stored in memory 120 and then executed by processor 125.

Logic 630 may also provide means (e.g., hardware, non-transitory computer-readable medium that stores executable instructions, firmware) for performing automatic zoom control of the timeline as described herein.

Generally describing an example configuration of the computer 600, the processor 125 may be a variety of various processors including dual microprocessor and other multi-processor architectures. A memory 120 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output (I/O) devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics.

In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:

access, by at least the processor, a database and retrieve a plurality of data records based on at least one match parameter, wherein each data record is assigned to an employee and includes a scheduled time range in a work day for the employee;

parse, by at least the processor, the plurality of data records and determine a minimum time and a maximum time from the scheduled time ranges from the plurality of data records;

control a zoom level for a display, by at least the processor, for displaying the scheduled time ranges from the plurality of data records comprising:

determine a screen area in a user interface for displaying the scheduled time ranges;

generate a graphical timeline to fit between the minimum time and the maximum time from the scheduled time ranges, and adjust a size of the graphical timeline based at least in part on the determined screen area, wherein the graphical timeline is generated by at least:

parsing the plurality of data records to identify data for actual reported hours for each employee;

determining the minimum time as an absolute minimum time between both the scheduled time ranges and the actual hours reported; and determining the maximum time as an absolute maximum time between both the scheduled time ranges and the actual hours reported;

wherein the graphical timeline is generated to expand between the absolute minimum time and the absolute maximum time in the determined screen area; and display, by at least the processor, the adjusted graphical timeline on the display in the determined screen area.

2. The non-transitory computer-readable medium of claim 1, wherein the instructions to control the zoom level further comprise instructions that when executed by at least the processor cause the processor to:

adjust the size of the graphical timeline to expand across the determined screen area to reduce an amount of unused screen area.

3. The non-transitory computer-readable medium of claim 1, wherein the instructions to control the zoom level further comprise instructions that when executed by at least the processor cause the processor to:

adjust the size of the graphical timeline to expand across the determined screen area and to display all the scheduled time ranges represented by graphical bars to fit in a column under the graphical timeline so that a horizontal scroll bar is not displayed.

4. The non-transitory computer-readable medium of claim 1, further comprising instructions that when executed by at least the processor cause the processor to:

display employee identification data for each of the employees in a first column in the screen area; and for each employee identification data, display in a second column in the screen area one or more graphical bars that represent the scheduled time range for each employee, wherein the second column is displayed under the graphical timeline to associate time periods.

5. The non-transitory computer-readable medium of claim 1, further comprising instructions configured to cause the process to determine the screen area by determining a size of a form factor of the display and determining a size of a displayed window that contains the user interface.

6. The non-transitory computer-readable medium of claim 1, further comprising instructions configured to cause the computer to display the scheduled time range from each of the retrieved plurality of data records using graphical horizontal bars; and wherein the graphical timeline is zoomed to cause the scheduled time range from each of the retrieved plurality of data records to be displayed in an entire form and be viewable on the display.

7. A computing system, comprising:
at least one processor connect to at least one memory;
a zoom controller module stored on a non-transitory computer readable medium and including instructions that when executed by at least the processor cause the processor to:
parse, by at least the processor, a plurality of data records wherein the plurality of data records are retrieved from a database based on at least one match parameter, wherein each data record is assigned to an employee and includes a scheduled time range in a work day for the employee;
determine a minimum time and a maximum time from the scheduled time ranges from the plurality of data records;
control a zoom level for a display, by at least the processor, for displaying the scheduled time ranges from the plurality of data records comprising:
determine a screen area in a user interface for displaying the scheduled time ranges;
generate a graphical timeline to fit between the minimum time and the maximum time and adjust a size of the graphical timeline based at least in part on the determined screen area wherein the graphical timeline is generated by at least:
parsing the plurality of data records to identify data for actual reported hours for each employee;
determining the minimum time as an absolute minimum time between both the scheduled time ranges and the actual hours reported; and
determining the maximum time as an absolute maximum time between both the scheduled time ranges and the actual hours reported;
wherein the graphical timeline is generated to expand between the absolute minimum time and the absolute maximum time in the determined screen area; and
display, by at least the processor, the adjusted graphical timeline on the display in the determined screen area.

8. The computing system of claim 7, wherein the zoom controller further comprises instructions that when executed by at least the processor cause the processor to:
adjust the size of the graphical timeline to expand across the determined screen area to reduce an amount of unused screen area.

9. The computing system of claim 7, wherein the zoom controller further comprises instructions that when executed by at least the processor cause the processor to:
adjust the size of the graphical timeline to expand across the determined screen area and to display all the scheduled time ranges represented by graphical bars to fit in a column under the graphical timeline so that a horizontal scroll bar is not displayed.

10. The computing system of claim 7, wherein the zoom controller further comprises instructions that when executed by at least the processor cause the processor to:
display employee identification data for each of the employees in a first column in the screen area; and
for each employee identification data, display in a second column in the screen area one or more graphical bars that represent the scheduled time range for each employee, wherein the second column is displayed under the graphical timeline to associate time periods.

11. The computing system of claim 7, wherein the zoom controller further comprises instructions that when executed by at least the processor cause the processor to determine the screen area by determining a size of a form factor of the display and determining a size of a displayed window that contains the user interface.

12. The computing system of claim 7, wherein the zoom controller further comprises instructions that when executed by at least the processor cause the processor to display the scheduled time range from each of the retrieved plurality of data records using graphical horizontal bars; and
wherein the graphical timeline is zoomed to cause the scheduled time range from each of the retrieved plurality of data records to be displayed in an entire form and be viewable on the display.

13. A computer-implemented method performed by a computing device including at least a processor, the method comprising:
accessing, by at least the processor, a database and retrieving a plurality of data records based on at least one match parameter, wherein each data record is assigned to an employee and includes a scheduled time range in a work day for the employee;
parsing, by at least the processor, the plurality of data records and determining a minimum time and a maximum time from the scheduled time ranges;
controlling, by at least the processor, a zoom level for a display for displaying the scheduled time ranges from the plurality of data records comprising:
determining a screen area in a user interface for displaying the scheduled time ranges;
generating a graphical timeline to fit between the minimum time and the maximum time and adjust a size of the graphical timeline based at least in part on the determined screen area, wherein the graphical timeline is generated by at least:
parsing the plurality of data records to identify data for actual reported hours for each employee;
determining the minimum time as an absolute minimum time between both the scheduled time ranges and the actual hours reported; and
determining the maximum time as an absolute maximum time between both the scheduled time ranges and the actual hours reported;
wherein the graphical timeline is generated to expand between the absolute minimum time and the absolute maximum time in the determined screen area; and
displaying, by at least the processor, the adjusted graphical timeline on the display in the determined screen area.

14. The method of claim 13, further comprising:
adjusting, by at least the processor, the size of the graphical timeline to expand across the determined screen area to reduce an amount of unused screen area.

15. The method of claim 13, further comprising:
adjusting the size of the graphical timeline to expand across the determined screen area and to display all the scheduled time ranges represented by graphical bars to fit in a column under the graphical timeline so that a horizontal scroll bar is not displayed.

16. The method of claim 13, further comprising:
controlling the display to display employee identification data for each of the employees in a first column in the screen area; and
for each employee identification data, displaying in a second column in the screen area one or more graphical bars that represent the scheduled time range for each employee, wherein the second column is displayed under the graphical timeline to associate time periods.

17. The method of claim 13, further comprising:
determining the screen area by determining a size of a form factor of the display and
determining a size of a displayed window that contains the user interface.

\* \* \* \* \*

UNITED STATES PATENT AND TRADEMARK OFFICE
CERTIFICATE OF CORRECTION

PATENT NO. : 10,902,364 B2  
APPLICATION NO. : 15/341466  
DATED : January 26, 2021  
INVENTOR(S) : Baskar et al.

Page 1 of 1

It is certified that error appears in the above-identified patent and that said Letters Patent is hereby corrected as shown below:

On the Title Page

Item (56), Column 2, under Other Publications, Line 2, delete "Langauges" and insert -- Languages --, therefor.

In the Claims

In Column 13, Line 31, in Claim 7, delete "area" and insert -- area, --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*